Aug. 3, 1954 D. W. COREY 2,685,550
METHOD OF FORMING A GUSSETED PURSE FOR POCKET RECEPTACLES
Filed April 10, 1952 3 Sheets-Sheet 1

INVENTOR
DONALD W. COREY
BY Chapin + Neal
ATTORNEYS

Aug. 3, 1954

D. W. COREY 2,685,550

METHOD OF FORMING A GUSSETED PURSE FOR POCKET RECEPTACLES

Filed April 10, 1952

INVENTOR
DONALD W. COREY

BY Chapin + Neal
ATTORNEYS

Aug. 3, 1954  D. W. COREY  2,685,550
METHOD OF FORMING A GUSSETED PURSE FOR POCKET RECEPTACLES
Filed April 10, 1952  3 Sheets-Sheet 3

INVENTOR
DONALD W. COREY.
BY Chapin + Neal
ATTORNEYS

Patented Aug. 3, 1954

2,685,550

UNITED STATES PATENT OFFICE 2,685,550

METHOD OF FORMING A GUSSETED PURSE FOR POCKET RECEPTACLES

Donald W. Corey, Springfield, Mass., assignor to Buxton, Incorporated, Springfield, Mass., a corporation of Massachusetts Application April 10, 1952, Serial No. 281,562

2 Claims. (Cl. 154—116)

This invention relates to an improvement in flexible pocket receptacles, such as billfolds, wallets, hand bags, and the like, formed from thermoplastic dielectric plastic sheeting, such as Vinylite sheeting and similar materials.

Flexible pocket receptacles are commonly formed from such materials by superimposing two or more suitably shaped blanks, cut from the sheeting, and connecting their edges together by so-called dielectric welding or sealing in which the edges or areas to be secured to each other are pressed against a platen by a suitably shaped "die." A high frequency current is then passed through the portions of the material engaged between the face of the die and the platen by placing the die and platen in circuit with a source of high frequency electric current.

The fact that all the sheets between the die faces and the platen are sealed together has limited the structural arrangements of flexible pocket receptacles so made, and has presented particular problems in providing gusseted pockets such as coin purses and in their attachment to a wall of the main receptacle.

Many expedients have been proposed to overcome these difficulties but such proposals have involved substantial amounts of hand labor, a waste of material, or both, and a sacrifice of structural efficiency and appearance.

These problems are increased when it is desired to construct the parts from differently colored material or material having an embossed or otherwise decorated surface.

It is the principal object of the present invention to provide a method which overcomes the above objections and limitations, provides an improved purse construction and permits greater flexibility in the choice of constructions and manner of assembling the elements of billfolds and other main receptacles in which purses are incorporated.

Other and further objects and advantages of the inventtion will be made apparent in the following specification and claims and in the accompanying drawings.

In the accompanying drawings which show a coin purse structure embodying the invention, Fig. 1 is a front view of the completed unit, parts being broken away;

Fig. 4 shows the blanks of Figs. 2 and 3 secured together and creased and "edged" by the first press operation;

Fig. 5 is a similar view showing the second press operation;

Fig. 6 is a perspective view on a smaller scale showing the purse structure, resulting from the press operations of Figs. 4 and 5, turned inside out;

Figure 2:
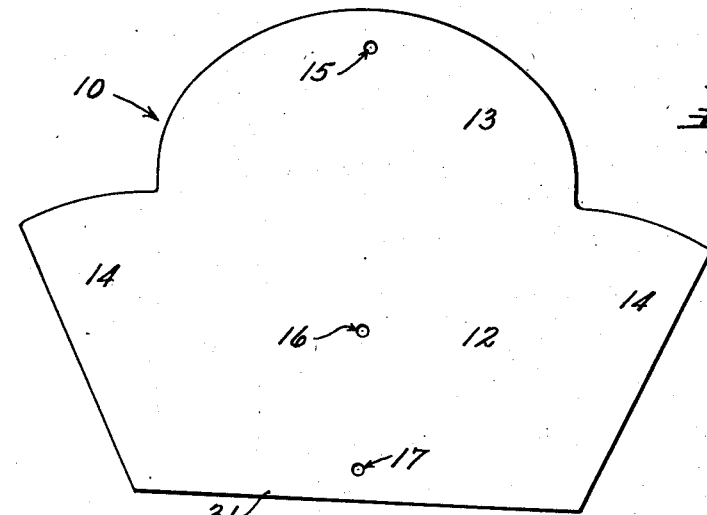
Fig. 2 shows the blank from which the rear wall and half of each gusset is formed.
Figure 3:
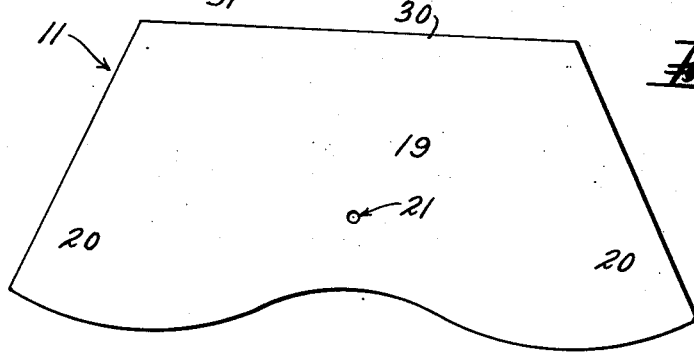
Fig. 3 shows the blank from which the front purse wall and the other half of each gusset is formed.

Referring to the drawings, blanks as shown respectively at 10 and 11 in Figs. 2 and 3 are cut from a sheet of suitable plastic sheeting. A multiplicity of the blanks may be and preferably are cut at one time from a stack of sheets. The material commonly has a finished or outer face which may carry an embossed design on a smooth or unfinished inner face.

Blank 10 comprises a portion 12 which will form the rear wall of the purse, a portion 13 which will form the flap of the purse, and two portions 14 which will respectively form the rear half of the gusset at each side of the purse. The blank 10 is provided with three small openings as indicated at 15, 16 and 17. Opening 15 is positioned to receive one of the members 18 (Fig. 1) of a snap fastener by which the finished purse is held releasably closed, but, with openings 16 and 17 it also functions as a positioning means in subsequent press operations as later described.

Blank 11 comprises a portion 19 which will form the front wall of the purse and two portions 20 which will form the forward half of the gusset at each side of the purse. Blank 11 is provided with an opening 21, which is positioned to receive the second member 22 (Fig. 1) of the snap fastener, and also serves as a positioning means in subsequent press operations.

The first press operation is shown in Fig. 4 where the blanks are shown in position on the press platen which is diagrammatically indicated at 25. The press platen carries pins 26, 27, 28 and 29 which engage in openings 15, 16, 17 and 21 respectively. The adjacent edge portions 30 and 31 of front wall 19 and rear wall 12, respectively are overlapped one on the other. The material is placed on the platen with its unfinished side uppermost. The press die, not shown, is provided with suitably profiled ribs which, upon actuation of the press, mold a finished edge 32 on the flap portion. Other ribs form parallel creases or fold lines 33 between the gusset portions 14 and rear wall 12, and similar creases 34 between the gusset portions 20 and front wall 19, together with a finished edge 35 on the free edge of the front wall portion. Another rib welds the edge portions 30 and 31 together and molds a crease or fold line, as shown at 36, along the line of juncture between the wall portions.

In the second press operation, shown in Fig. 5, the material is placed on the platen with the finished or design side uppermost and the front wall portion is folded along the weld line 36 to superpose the front face of the front wall 19 and gusset portions 20 respectively on the outer face of the rear wall 12 and gusset portions 14. The so-called blank is then positioned on a press platen, indicated at 37, which is provided with a pin 38 which fits in opening 15 and with a pin 39 which fits through the now aligned openings 16 and 21. The press die, not shown, is provided with ribs which weld the outer side edges of the superposed gusset portions 20—14 together as shown 40, when the press is closed.

The structure is now removed from the press and turned inside out as shown in Fig. 6, positioning the completed gussets inwardly of the purse. As previously stated the blank or blanks are placed on the press platen 25 with the unfinished inner surface of the sheeting uppermost so that when the purse is turned inside out the finished surface and any design carried thereby is presented on the outside of the purse. Where the purse is to be constructed of a single color or design of material the blanks 10 and 11 may be unitary, the first press operation forming a crease at 36. Where, however, a two color purse is to be made or the outer face of the front wall is to carry a design while the rear wall is plain, the blanks 10 and 11 will be separate, as described, and sealed together along line 36.

Figure 1:
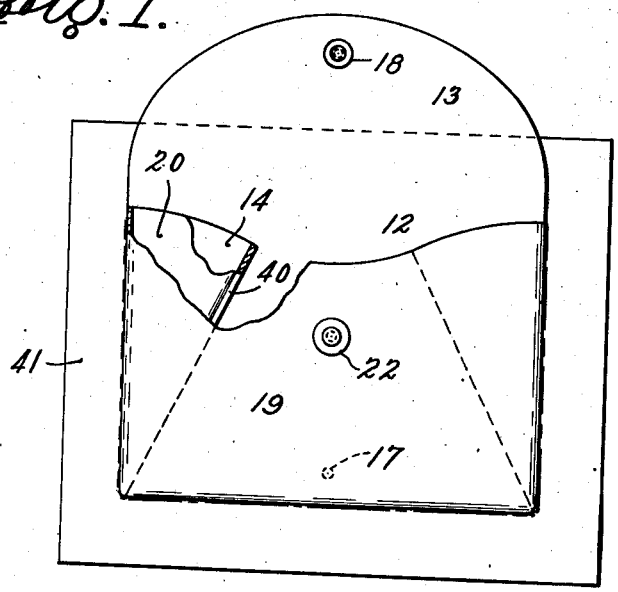
Figure 7:
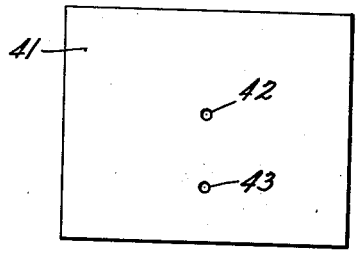
Fig. 7 shows, on the scale of Fig. 6, the blank from which the supporting member is formed.
Figure 8:
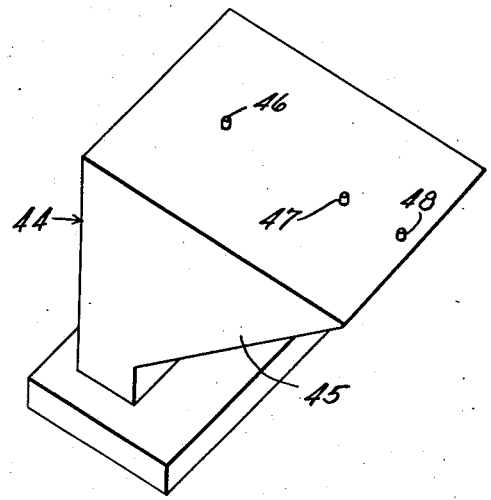
Fig. 8 is a diagrammatic perspective view of a platen for the final press operation.
Figure 9:
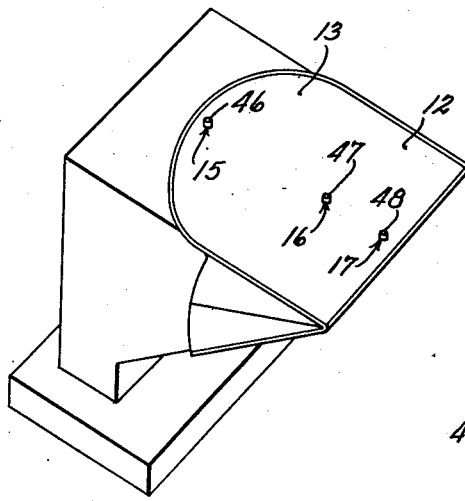
Fig. 9 is a similar view showing the structure of Fig. 6 in position on the platen of Fig. 8.
Figure 10:
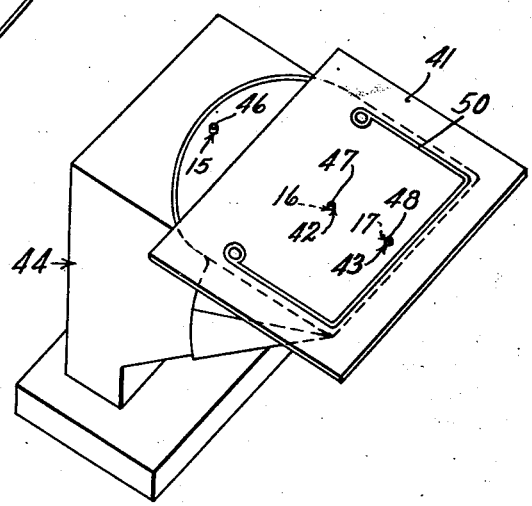
Fig. 10 shows the final press operation in which the purse element and its supporting member are secured together.

For incorporation into a billfold or other receptacle the purse of Fig. 6 is welded to a blank of dielectric thermoplastic material which is to form one of the elements of the receptacle, such for example as the blank 41 of Figs. 1 and 7, the latter figure as well as Figs. 8, 9 and 10 being on a smaller scale than Figs. 1 to 5.

The blank 41 as shown is of suitable dimensions to form one of the side panels of a billfold and is provided with guide openings 42 and 43. For securing the purse of Fig. 6 to the blank 41 a cantilever platen is provided as shown at 44 in Fig. 8. The platen includes a triangular prismatic portion 45 which is inserted into the opened purse as shown in Fig. 9. The upper surface of platen 45 is provided with pins 46, 47 and 48 engaging respectively in openings 15, 16 and 17 in the closure flap and rear wall of the purse. Blank 41 is inverted and superposed on the purse with openings 42 and 43 engaged by pins 47 and 48 as shown in Fig. 10. Openings 42 and 43 are so positioned in blanks 41 as to position the latter in desired relation with the purse. The press die, not shown, is provided with a generally U-shaped rib which welds the blanks 41 to the rear wall 13 of the purse as indicated at 50, when the press is closed. The unit is now in condition to be incorporated in a billfold by the press welding steps by which the elements of the billfold are secured together.

The openings 15 and 21 may be supplied with snap fastener members at any convenient time after they have served their additional function as means for positioning the parts with relation to the several press platens and other elements of the purse or main receptacle structure. The provision of the guide openings in the blanks and the guide pins on the press platens provide sufficient accuracy in the positioning of the blanks relative to the die so that the finish edges such as 32 and 35 may be molded in the most desirable form without providing cutting or semi-cutting formation on the outer edges of the die to provide for removal of excess material or flash.

By the described arrangement, a fully gusseted purse is provided in which the welded edges are positioned within the purse. When the flap 13 is in purse closing position, all four edges of the supporting member 41 are clear of the purse and available for subsequent welding operations without damage to the purse structure itself. The blank 41 which is to form a wall or other structural element of a larger receptacle may be handled in the same manner in the construction of the latter as it would be if the purse were not present. The openings 16 and 17 in the back member of the purse are so positioned as to provide ventilation for the interior of the purse as well as the ungusseted pocket which the U-shaped weld 50 provides between the rear purse wall 12 and the wall member 41, of the main receptacle.

What is claimed is:

1. The method of forming a gusseted purse from dielectric thermoplastic sheeting for incorporation in a main receptacle structure which comprises, forming from such sheeting a blank including a rear wall portion and a front wall portion joined together along a line forming the bottom of the purse, each said wall portion having a half gusset portion extending from each side edge thereof and the rear wall portion having a closure flap extending from the remaining free edge thereof, providing said front wall portion and flap with openings positioned to receive the members of a snap fastener and providing said rear wall section with two similar openings, dielectrically molding fold lines in the blank between each gusset portion and the adjacent wall portion and along the line of juncture between the wall portions while the blank is held positioned by pins extending through said openings, folding the front wall portion onto the rear wall portion along the fold line between the walls to position the half gusset portions at the respective sides of said wall portions in superposed relation with their free side edges coinciding and to position the opening in the front wall and one of the openings in the rear wall in alignment, dielectrically welding said coinciding free gusset side edges together while the folded blank is held positioned by pins extending through said openings, turning the structure inside out to position the gussets inwardly between the front and rear walls of the purse, positioning the purse with its rear wall upwardly on a platen extending into the purse, providing a blanked out wall member of a main receptacle with spaced openings corresponding to those in the rear wall of the purse, superposing said wall member face downward on the rear wall of the purse with the openings in the rear wall of the purse and said member in alignment and dielectrically welding said member to the purse while the purse and wall member are positioned by pins carried by the platen and extending through said aligned openings.

2. The method of forming a gusseted purse from dielectric thermoplastic sheeting which comprises, forming from such sheeting a blank including a rear wall portion and a front wall portion joined together along a line forming the bottom of the purse, each said wall portion having a half gusset portion extending from each side edge thereof and the rear wall portion having a closure flap extending from the remaining free edge thereof, providing said front wall portion and flap with openings positioned to receive the members of a snap fastener and providing said rear wall section with a similar opening, dielectrically molding fold lines in the blank between each gusset portion and the adjacent wall portion and along the line of juncture between the wall portions while the blank is held positioned by pins extending through said openings, folding the front wall portion onto the rear wall portion along the fold line between the walls to position the half gusset portions at the respective sides of said wall portions in superposed relation with their free side edges coinciding and to position the openings in the front and rear walls in alignment, dielectrically welding said coinciding free gusset side edges together while the folded blank is held positioned by pins extending respectively through said coinciding openings and the opening in said flap, and turning the structure inside out to position the gussets inwardly between the front and rear walls of the purse.

References Cited in the file of this patent

UNITED STATES PATENTS

| Number | Name | Date |
|---|---|---|
| 2,353,222 | Coolbroth | July 11, 1944 |
| 2,587,033 | Dobbs et al. | Feb. 26, 1952 |